(12) United States Patent
Jang et al.

(10) Patent No.: US 7,474,370 B2
(45) Date of Patent: Jan. 6, 2009

(54) VERTICALLY ALIGNED LIQUID CRYSTAL DISPLAY

(75) Inventors: Soo-jin Jang, Seoul (KR); Byoung-kun Jeon, Daejeon (KR); Sergey Belyaev, Dajeon (KR); Jun-won Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 263 days.

(21) Appl. No.: 11/271,954

(22) Filed: Nov. 14, 2005

(65) Prior Publication Data
US 2006/0103798 A1 May 18, 2006

(30) Foreign Application Priority Data
Nov. 12, 2004 (KR) .................. 10-2004-0092552

(51) Int. Cl.
*G02F 1/1335* (2006.01)
(52) U.S. Cl. .................. 349/119; 349/117; 349/118
(58) Field of Classification Search ......... 349/117–119, 349/130
See application file for complete search history.

(56) References Cited

U.S. PATENT DOCUMENTS

| | | | |
|---|---|---|---|
| 4,889,412 A | 12/1989 | Clerc et al. | |
| 6,141,075 A | 10/2000 | Ohmuro et al. | |
| 6,646,701 B2 | 11/2003 | Lyu et al. | |
| 7,227,602 B2 * | 6/2007 | Jeon et al. | 349/119 |
| 2005/0219447 A1 * | 10/2005 | Slaney et al. | 349/117 |
| 2006/0132686 A1 * | 6/2006 | Jeon et al. | 349/117 |
| 2006/0244884 A1 * | 11/2006 | Jeon et al. | 349/119 |

FOREIGN PATENT DOCUMENTS

WO  WO 2004/068225 A1  8/2004
WO  WO 2004/068226 A1  8/2004

* cited by examiner

*Primary Examiner*—David Nelms
*Assistant Examiner*—Thanh-Nhan P Nguyen
(74) *Attorney, Agent, or Firm*—McKenna Long & Aldridge LLP

(57) ABSTRACT

A vertically aligned liquid crystal display (VA-LCD) according to one embodiment has liquid crystal cells in which liquid crystals with a negative dielectric anisotropy are filled and which is provided between a first polarizer and a second polarizer, whose absorption axes are perpendicular to each other. The VA-LCD includes a sheet of +A plate and a sheet of −C plate, disposed between the first polarizer and the liquid crystal cells, and a sheet of +A plate disposed between the second polarizer and the liquid crystal cells, where an optical axis of the +A plate near the first polarizer is perpendicular to the absorption axis of the first polarizer, and an optical axis of the +A plate near the second polarizer is parallel with the absorption axis of the second polarizer, and where a thickness retardation value of the −C plate is in the range of −500 nm to −30 nm for a wavelength of 550 nm.

18 Claims, 12 Drawing Sheets

US 7,474,370 B2

VERTICALLY ALIGNED LIQUID CRYSTAL DISPLAY

CROSS-REFERENCE TO RELATED APPLICATIONS

This application claims the benefit under 35 U.S.C. § 119(a) of Korean Application No. 2004-0092552, filed on Nov. 12, 2004, in the Korean Intellectual Property Office, the entire disclosure of which is incorporated herein by reference.

BACKGROUND OF THE INVENTION

1. Field of the Invention

The present invention relates to a vertically aligned liquid crystal display (hereinafter, referred as "VA-LCD"). More particularly, the present invention relates to a VA-LCD in which contrast ratio in the front viewing direction and tilt viewing directions is improved by using a viewing angle compensation film.

2. Description of the Related Art

There are two primary reasons of degradation of a viewing angle of VA-LCDs: first one is the viewing angle dependence of a perpendicular polarizer and second one is the viewing angle dependence of birefringence of a VA-LCD panel.

U.S. Pat. No. 4,889,412 disclosed a VA-LCD using a –C plate compensation film as a viewing angle compensation film. The main function of the –C plate is to compensate the black state of a VA-LCD when a voltage is not applied. However, a VA-LCD with –C plate compensation film has a problem that leakage of light is caused at a tilt angle because the –C plate can not completely compensate the black state.

In order to solve the problem above, U.S. Pat. No. 6,141,075 disclosed a VA-LCD with two compensation films, a –C plate and a +A plate compensation films. The device can compensate the black state on which a voltage is not applied more well compared to the device with the –C plate only, but the minimum contrast at a tilt viewing angle of 70 degrees is 20:1 at most. Accordingly, there is still need to improve contrast at both of the right angle and tilt angles.

Accordingly, the inventors of the present application reached this invention, feeling that a sheet +A plate and a sheet of –C plate have a limit in compensating the viewing angle.

SUMMARY OF THE INVENTION

An aspect of the present invention is to solve at least the above problems and/or disadvantages and to provide at least the advantages described below. Accordingly, an aspect of the present invention is to provide a VA-LCD with high contrast at the front viewing direction and the declination viewing direction by minimizing leakage of light of a black state.

Additional aspects and/or advantages of the present invention will be set forth in part in the description which follows and, in part, will be obvious from the description or the practice of the invention.

The above aspects and advantages of the present invention are accomplished by a VA-LCD having liquid crystal cells in which liquid crystals with a negative dielectric anisotropy are filled and which is provided between a first polarizer and a second polarizer, whose absorption axises are perpendicular to each other, where the VA-LCD includes a sheet of +A plate and a sheet of –C plate, disposed between the first polarizer and the liquid crystal cells, and a sheet of +A plate disposed between the second polarizer and the liquid crystal cells, wherein an optical axis of the +A plate near the first polarizer is perpendicular to the absorption axis of the first polarizer, and an optical axis of the +A plate near the second polarizer is perpendicular to the absorption axis of the second polarizer.

Another aspect of the present invention is to provide a VA-LCD having liquid crystal cells in which liquid crystals with a negative dielectric anisotropy are filled and which are disposed between a first polarizer and a second polarizer, whose absorption axises are perpendicular to each other, where the VA-LCD includes a bi-axial retardation film disposed between the first polarizer and the liquid crystal cells, and a sheet of +A plate disposed between the second polarizer and the liquid crystal cells, wherein an optical axis of the bi-axial retardation film near the first polarizer is perpendicular to the absorption axis of the first polarizer, and an optical axis of the +A plate is parallel with the absorption axis of the second polarizer.

BRIEF DESCRIPTION OF THE DRAWINGS

The above and other objects, and features, and advantages of certain embodiments of the present invention will be more apparent from the following description taken in conjunction with the accompanying drawings, in which.

DETAILED DESCRIPTION OF EXEMPLARY EMBODIMENTS

Figure 1:
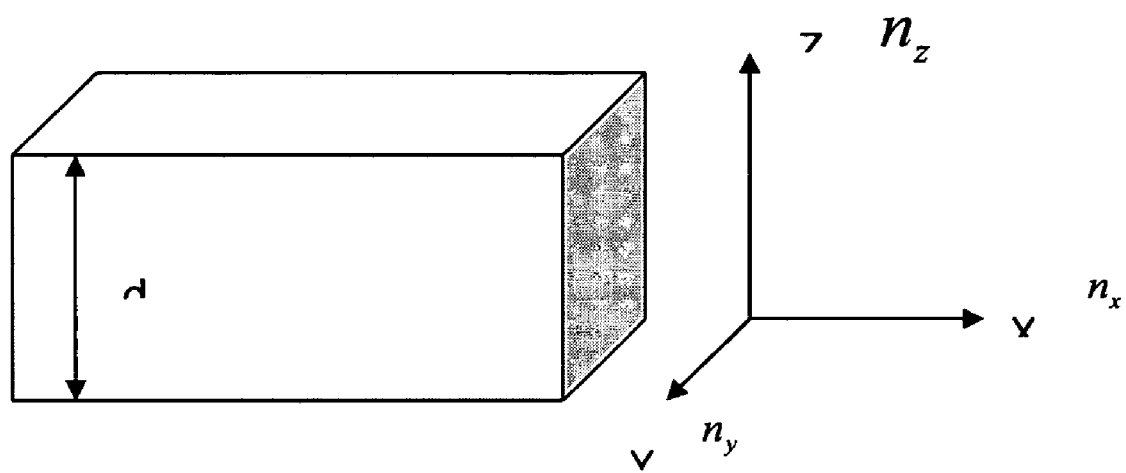
FIG. 1 is a view for explaining refraction index of a phase difference film.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for conciseness.

Hereinafter, the present invention will be described in detail.

An LCD according to an embodiment of the present invention is a VA-LCD in which an optical axis of liquid crystals in liquid crystal cells is perpendicular to a polarizer, and includes a first polarizer 1, a liquid crystal cell 8 which includes two glass substrates and vertically aligned liquid crystals with a negative dielectric anisotropy ($\Delta \in <0$), filled between the two glass substrates, and a second polarizer 3, where an absorption axis 2 of the first polarizer 1 is perpendicular to an absorption axis 4 of the second polarizer 3.

The VA-LCD can use a multidomain vertically aligned (MVA) mode since a ridge structure including a pair of electrodes is formed on the surface adjacent to a liquid crystal layer, or a vertically aligned (VA) mode utilizing a chiral additive.

A cell gap of the liquid crystal cell is 2.5 to 8 μm.

The white state of a VA-LCD is based on the principle that incident light from a backlight in an orthogonal polarization state is linearly polarized by 0 degrees, the linearly polarized light passes a liquid crystal layer, and the emerging light passing out the liquid crystal layer is linearly polarized by 90 degrees. In order to change the 0-degree linear polarized light to the 90-degree linear polarized light, a retardation value of the liquid crystal layer should be ½ of a wavelength of the incident light.

According to the present invention, as a phase difference compensation film to compensate a viewing angle of a VA-LCD, a combination of a +A plate and a −C plate is provided between a first polarizer and a liquid crystal layer or a bi-axial retardation film is used, and further a +A plate is disposed adjacent to a second polarizer, thereby implementing a wide viewing angle.

Referring to FIG. 1, a refraction index of a retardation film of used for compensating a viewing angle of a VA-LCD is as follows:

Given that when an X-axis refraction index is $n_x$ (13), a y-axis refraction index is $n_y$ (14), and a refraction index in the direction of thickness d is $n_z$ (15), among in-plane refraction indexes, a characteristic of a retardation film is determined by the refraction index.

A retardation film in which refraction indexes of two-axis among refraction indexes of three-axis are different is called a uni-axial retardation film, and a retardation film in which refraction indexes of three-axis are different is called a bi-axial retardation film. At this time, the retardation film is defined as follows:

(1) given that $n_x > n_y = n_z$, it is called a +A plate, and an in-plane retardation value, $R_{in}$ is defined by equation 1 using a difference between two refraction indexes and a film thickness.

$$R_{in} = d \times (n_x - n_y) \qquad \text{[Equation 1]}$$

Here, d is a film thickness.

(2) given that $n_x = n_y > n_z$, it is called a −C plate, and its film thickness retardation value, $R_{th}$ is determined by equation 2 using the in-plane retardation value, the thickness retardation value and a film thickness.

$$R_{th} = d \times (n_z - n_y) \qquad \text{[Equation 2]}$$

Here, d is a film thickness.

The +A plate has the thickness retardation value, which is nearly zero, and has a positive value of the in-plane retardation value. Among the +A plates used for compensating viewing angles, the +A plate (hereinafter referred as "A1 plate") being close to a first polarizer has the in-plane retardation value in the range of from 50 to 300 nm for a wavelength of 550 nm, and the +A plate (hereinafter referred as A2 plate) being close to a second polarizer should have the in-plane retardation value in the range of from 30 to 600 nm for a wavelength of 550 nm.

Examples of the +A plate can include a polymer film and a UV setting liquid crystal film. The −C plate has the in-plane retardation value of nearly zero value, and the thickness retardation value of a negative value.

The thickness retardation value of the −C plate used for compensating viewing angles of a VA-LCD must be in a range of −500 nm to 30 nm for a wavelength of 550 nm. Examples of the −C plate can include a polymer film and a UV setting liquid crystal film.

Figure 2:
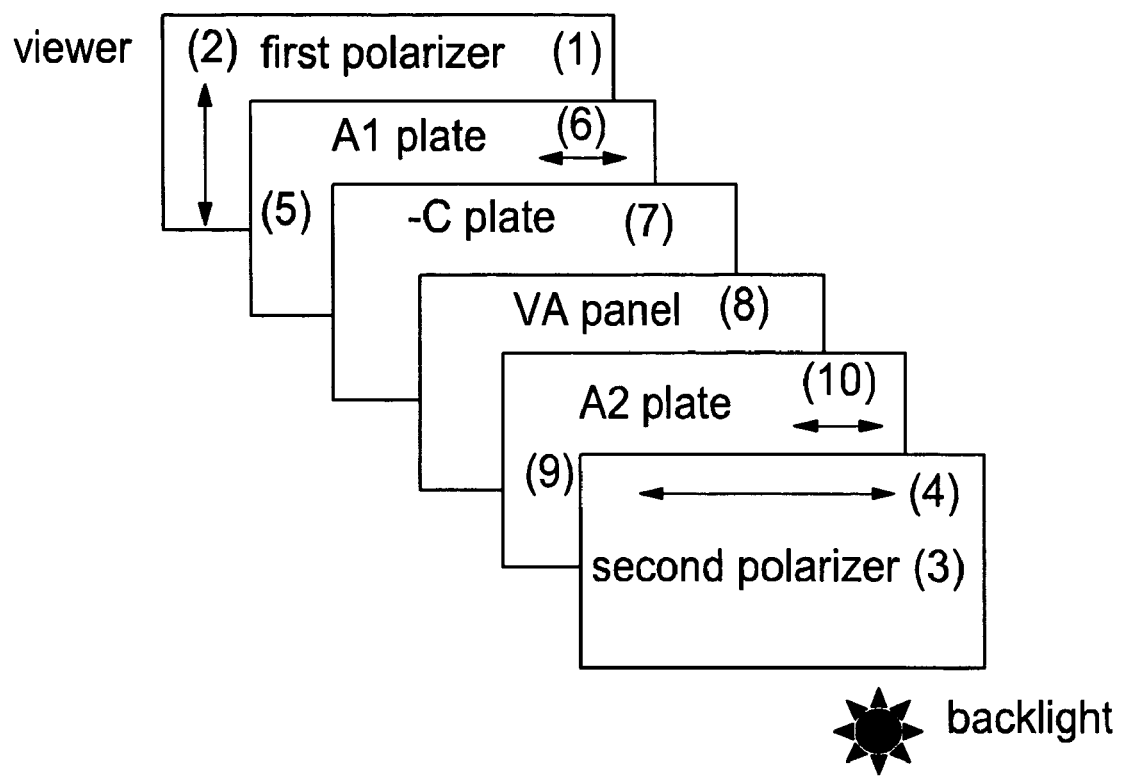
FIG. 2 is a schematic view illustrating a VA-LCD with a compensation film according to a first embodiment of the present invention.
Figure 3:
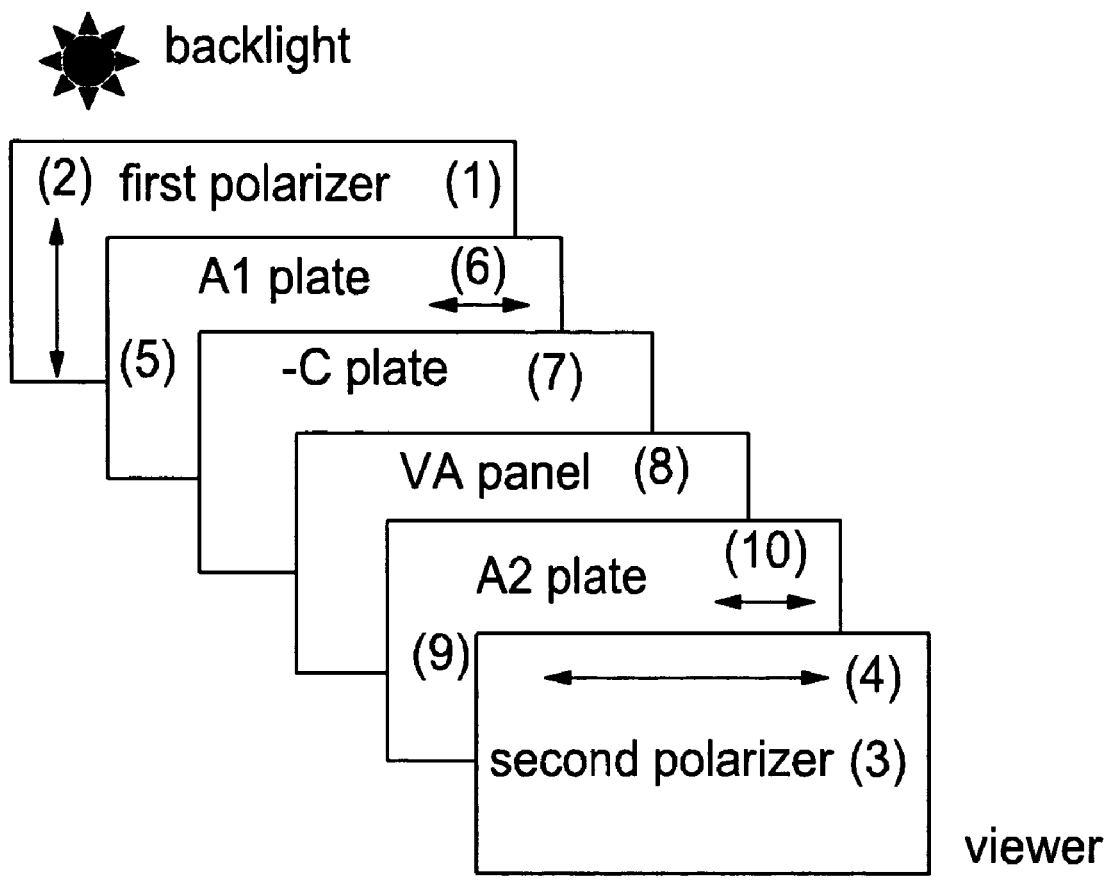
FIG. 3 is a schematic view illustrating a VA-LCD with a compensation film according to a second embodiment of the present invention.
Figure 4:
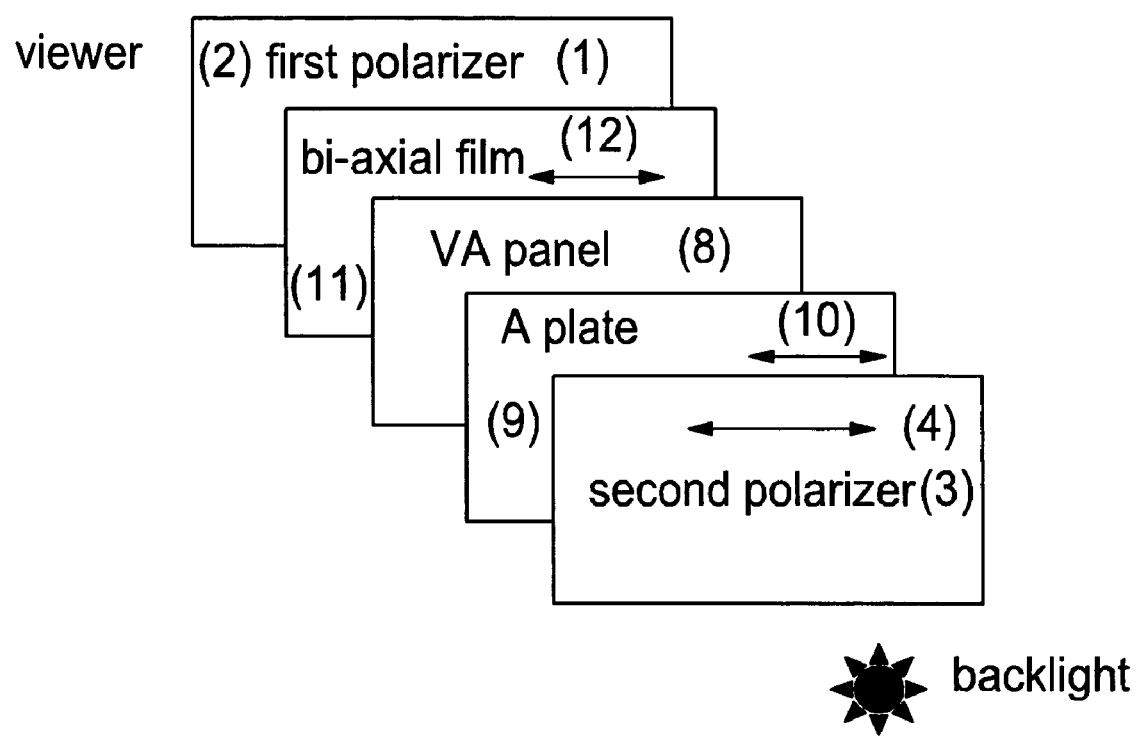
FIG. 4 is a schematic view illustrating a VA-LCD with a compensation film according to a third embodiment of the present invention.
Figure 5:
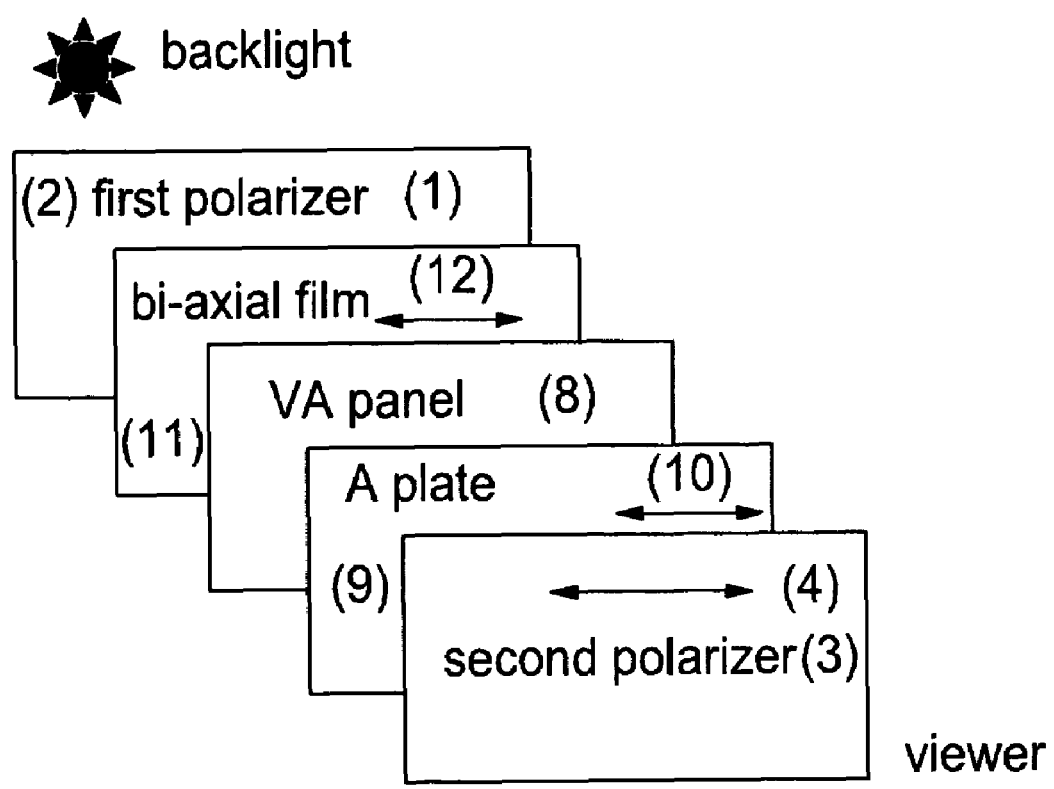
FIG. 5 is a schematic view illustrating a VA-LCD with a compensation film according to a fourth embodiment of the present invention.

FIG. 2 and FIG. 3 illustrates the configuration of a VA-LCD including two viewing angle compensation films, a +A plate and a −C plate. FIG. 4 and FIG. 5 illustrate the configuration of a VA-LCD including a bi-axial film and a +A plate as the viewing angle compensation films.

In designing a viewing angle compensation polarizer of a VA-LCD, an inner protective film can function as a retardation film by having a thickness retardation value of zero value or negative value. In cases that the inner protection film has and does not have the thickness retardation value, the designed values of the two plates, +A plate and −C plate, or bi-axial retardation film and +A plate vary.

Examples of a material for the inner protective film include undrawn cyclo-olefin, undrawn triacetate cellulose, and undrawn polynobodene.

Change of the designed values of two plates, the combination of +A plate and −C plate, and the combination of bi-axial retardation film and +A plate, is shown in table 1 and table 2.

As shown in FIG. 2, an LCD device according to a first embodiment of the present invention is depicted where two plates, a +A plate (A1 plate) 5 and a −C plate 7, are disposed between a liquid crystal layer 8 and a first polarizer 1, and another +A plate (A2 plate) 9 is disposed between a second polarizer 3 and the liquid crystal layer 8.

The A1 plate 5 and the −C plate 7 are disposed between the liquid crystal layer 8 and the first polarizer 1, and −C plate 7 is disposed between the liquid crystal layer 8 and the A1 plate 5. At this time, an optical axis 6 of the A1 plate is arranged to be perpendicular to an absorption axis 2 of the first polarizer. An optical axis 10 of the A2 plate is arranged to be parallel with the absorption axis of the second polarizer. Accordingly, wider viewing angle compensation is possible.

At this time, a backlight is arranged to be close to the second polarizer 3 and the LCD viewing direction is close to the first polarizer 1.

In designing such compensation configuration, the A1 plate 5 disposed between the first polarizer 1 and the liquid crystal layer 8 has the in-plane retardation value in the range of from 50 nm to 300 nm for a wavelength of 550 nm, and the −C plate 7 has the thickness retardation value in the range of from −500 nm to −30 nm for a wavelength of 550 nm. Further, the A2 plate 9 (another +A plate) disposed between the second polarizer and the liquid crystal layer has the thickness retardation value in the range of from 30 nm to 600 nm for a wavelength of 550 nm. Further, it is preferable that the A2 plate (another +A plate) 9 has the in-plane retardation value in the range of from 30 nm to 600 nm for a wavelength of 550 nm.

As described above, the simulation result of the LCD under the same conditions described above will be shown in FIG. 6 and table 1.

TABLE 1

| Inner protective film of first polarizer | Retardation of VA panel | Retardation of −C plate (nm) | Retardation on +A plate close to first polarizer (nm) | Retardation of +A1 plate close to second polarizer (nm) | Inner protective film of second polarizer | Minimum contrast in declination angle of 70 degrees |
|---|---|---|---|---|---|---|
| Isotropy COP | 332 nm | −220 | 150 | 40 | Isotropy COP | 112 |
| | | −200 | 150 | 60 | 40 μm TAC | 117 |
| | | −200 | 200 | 90 | 80 μm TAC | 83 |
| 40 μm TAC | | −200 | 100 | 30 | Isotropy COP | 60 |
| | | −240 | 90 | 340 | 40 μm TAC | 86 |
| | | −170 | 140 | 50 | 80 μm TAC | 123 |
| 80 μm TAC | | −200 | 100 | 50 | Isotropy COP | 95 |
| | | −240 | 90 | 50 | 40 μm TAC | 96 |
| | | −180 | 120 | 80 | 80 μm TAC | 88 |

In table 1, the inisotropy COP used for the inner protection film of the polarizer is cyclo-olefin polymer and has a thickness of 50 μm. On the other hand, the 40 μm TAC used for the inner protection film is made of triacetate cellulose and its retardation 15 value is 28 nm. In case of 80 μm TAC, it is made of cellulose and its retardation value is −56 nm.

In table 1, simulated contrast ratio (ratio of white state to black state) at 70 degrees of a VA-LCD is shown.

The contrast ratio is a factor to determine the sharpness of a screen, and the higher contrast ratio means the higher sharpness. 70 degrees is adopted as a tilt viewing angle because a characteristic of a VA-LCD is the worst at 70 degrees.

The minimum contrast ratio of a VA-LCD without a viewing angle compensation film is 10:1. However, the contrast ratio of the VA-LCD of the present invention is improved as shown in table 1. The improvement of contrast ratio at the tilt viewing angle of 70 degrees means the improvement of contrast ratio at all the tilt viewing angles.

FIG. 3 illustrates the configuration of a VA-LCD with a compensation film according to a second embodiment of the present invention. In the VA-LCD according to the second embodiment of the present invention, an A1 plate 5 and a −C plate 7 are disposed between a first polarizer 1 and a VA liquid crystal cell 8, and the A1 plate 5 is disposed to be close to the first polarizer 1. An optical axis 6 of the A1 plate is arranged to be perpendicular to the absorption axis 2 of the first polarizer. At this time, a backlight is arranged to be close to the first polarizer 1 and a viewer is close to a second polarizer 3.

Figure 7:
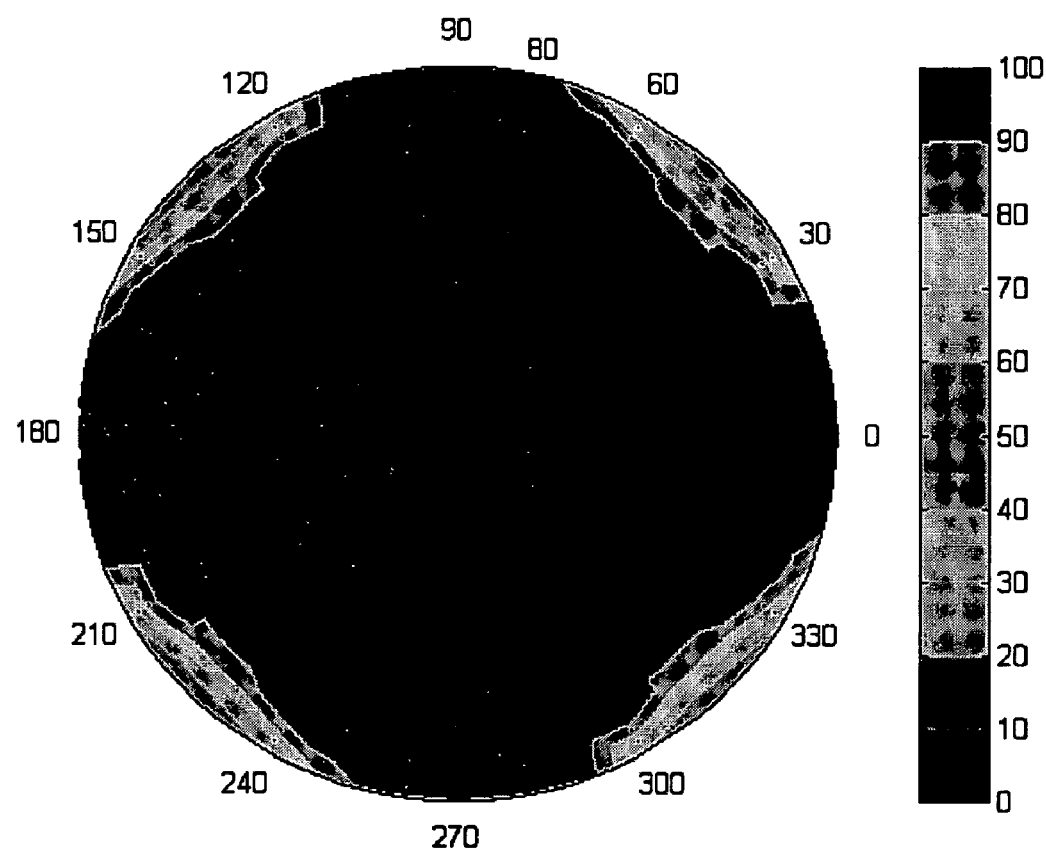
FIG. 7 is a simulation result of contrast ratio of the VA-LCD according to the second embodiment of the present invention over tilt viewing angles of from 0 to 80 degrees when using white-light.

In such a configuration, a simulation result where designed values of a retardation film are applied is as shown in FIG. 7.

In a VA-LCD according to the second embodiment of the present invention, a bi-axial retardation film 11 is disposed between the liquid crystal layer 8 and the polarizer 1, and at this time the optical axis 12 of the bi-axial retardation film is arranged to be perpendicular to the absorption axis 2 of the adjacent first polarizer. On the other hand, a +A plate 9 is disposed between the liquid crystal layer 8 and a second polarizer 3 and at this time the optical axis 10 of the +A plate is arranged to be parallel with the absorption axis 4 of the second polarizer. Accordingly, the VA-LCD in accordance with the second embodiment of the present invention can compensate an LCD viewing angle.

In the configuration above, the bi-axial retardation film disposed between the first polarizer 1 and the liquid crystal layer 8 preferably has the in-plane retardation value in the range of from 30 nm to 200 nm for a wavelength of 550 nm, and the thickness retardation value in the range of from −300 nm to −50 nm for the wavelength of 550 nm. The +A plate 9 disposed between the second polarizer 3 and the liquid crystal layer 8 preferably has the in-plane retardation value in the range of from 30 nm to 600 nm for a wavelength of 550 nm.

A material of the bi-axial retardation film includes cyclo-olefin, drawn triacetate cellulose, drawn polynobone, and the bi-axial liquid crystal film.

FIG. 4 illustrates the configuration of a VA-LCD according to a third embodiment of the present invention. A bi-axial retardation film 11 is disposed between a first polarizer 1 and a VA liquid crystal layer 8, and at this time the optical axis 12 of the bi-axial retardation film is arranged to be perpendicular to the absorption axis 2 of the first polarizer. A backlight is close to a second polarizer 3 and a viewing direction is the direction of becoming close to the first polarizer 1.

Figure 8:
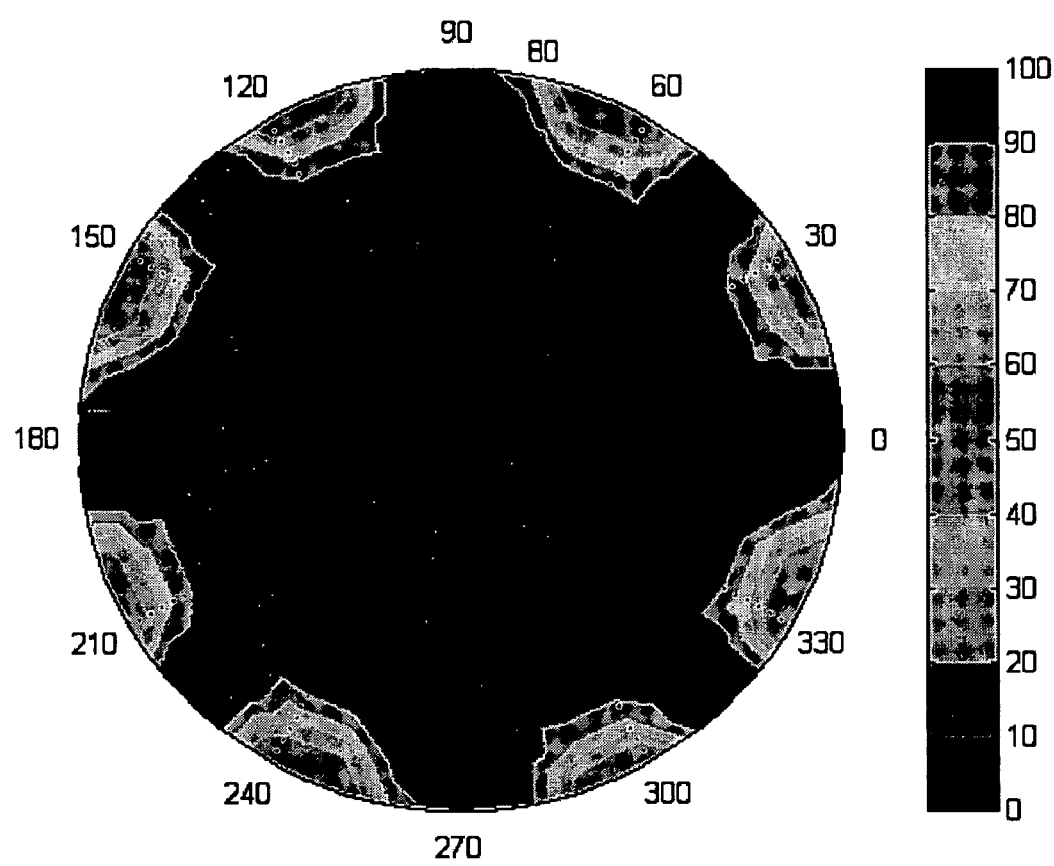
FIG. 8 is a simulation result of contrast ratio of the VA-LCD according to the third embodiment of the present invention over tilt viewing angles of from 0 to 80 degrees when using white-light.

With the configuration as described above, a simulation result of the contract characteristic obtained when the designed value of the actual retardation film is applied is shown in FIG. 8 and table 2.

TABLE 2

| Inner protective film of first polarizer | Retardation of VA panel | Film of bi-axial retardation film ($R_{in}$, $R_{th}$) | Retardation value of +A plate close to a second polarizer (nm) | Inner protective film of second polarizer | Minimum contrast ratio at 70 degrees of declination angle |
|---|---|---|---|---|---|
| Isotropy COP | 332 nm | (60, −190) | 30 | Isotropy COP | 51 |
| | | (70, −170) | 30 | 40 μm TAC | 48 |
| | | (70, −160) | 30 | 80 μm TAC | 51 |
| 40 μm TAC | | (50, −160) | 500 | Isotropy COP | 54 |
| | | (50, −200) | 250 | 40 μm TAC | 47 |
| | | (70, −140) | 30 | 80 μm TAC | 57 |
| 80 μm TAC | | (50, −160) | 200 | Isotropy COP | 48 |
| | | (60, −140) | 30 | 40 μm TAC | 47 |
| | | (70, −120) | 30 | 80 μm TAC | 48 |

In table 2, the isotropy COP used for an inner protective film of a polarizer is cyclo-olefin with a thickness of 50 μm.

On the other hand, the 40 μm TAC is triacetate cellulose and its a retardation value is 28 nm, and the 80 μm TAC is triacetate cellulose and its retardation is −56 nm.

FIG. 5 illustrates the configuration of a VA-LCD according to a fourth embodiment of the present invention. A bi-axial retardation film 11 is disposed between a first polarizer 1 and a VA liquid crystal layer 8, and at this time an optical axis 12 of the bi-axial retardation film is arranged to be perpendicular to an absorption axis 2 of the first polarizer. At this time, a backlight is close to the first polarizer 1 and a viewing direction is the direction becoming close to a second polarizer 3.

Figure 9:
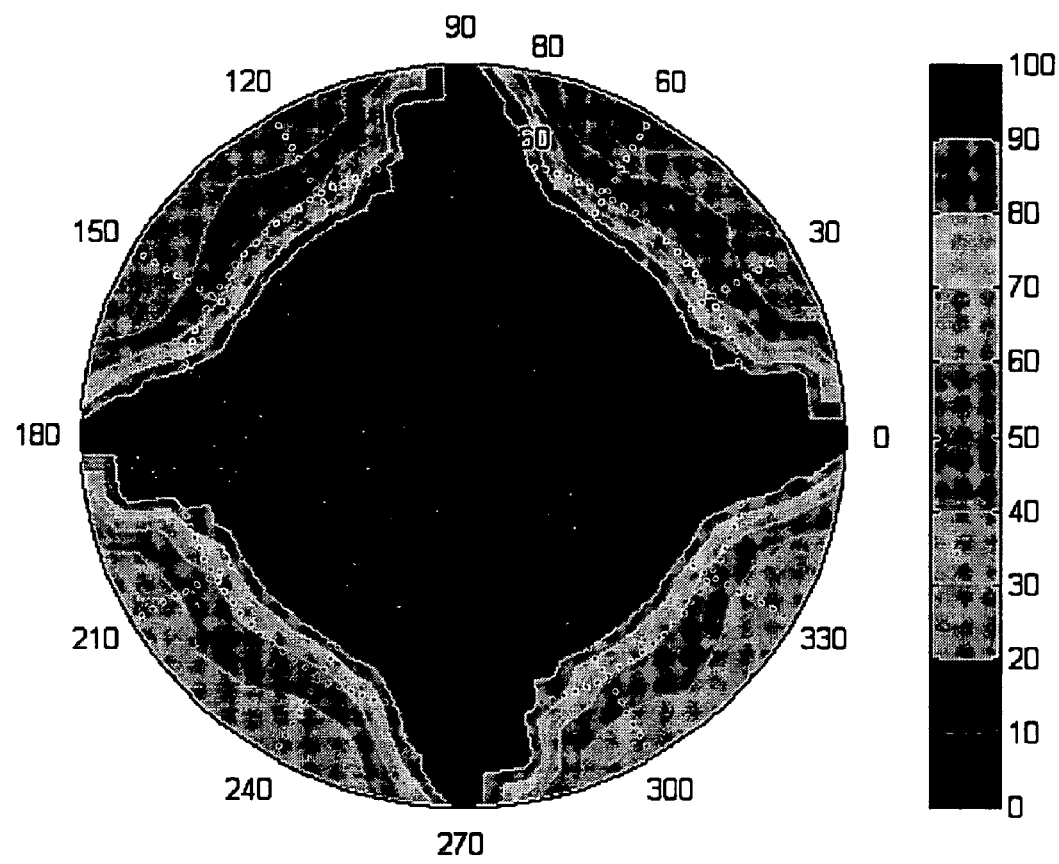
FIG. 9 is a simulation result of contrast ratio of the VA-LCD according to the fourth embodiment of the present invention over tilt viewing angles of from 0 to 80 degrees when using white-light.

With the configuration described above, a simulation result of the contrast characteristic obtained when the designed value of the actual retardation film is applied is shown in FIG. 9.

The present invention will be described in more detail with reference to embodiments below, but the present invention is not limited thereto.

Embodiment 1

Configuration of the First VA-LCD

Referring to FIG. 2, a VA-panel comprises a plurality of VA liquid crystal cells 8 having a cell gap of 2.9 μm where the liquid crystal cell is filled with liquid crystals having a pre-title angle of 90 degrees, a dielectric anisotropy $\Delta\in$ is −4.9, and a birefringence $\Delta n$ is 0.099. The −C plate 7 is made of a liquid crystal film, and has a thickness retardation value $R_{th}$ of −240 nm for a wavelength of 550 nm. The A1 plate 5 being close to the first polarizer 1 has an in-plane retardation value $R_{in}$ of 90 nm, and the A2 plate 9 being close to the second polarizer 3 has an in-plane retardation value $R_{in}$ of 340 nm. The inner protective films of the first polarizer 1 and the second polarizer 3 are made of triacetate cellulose film with a thickness of 40 μm and a thickness retardation value of −28 nm.

Figure 6:
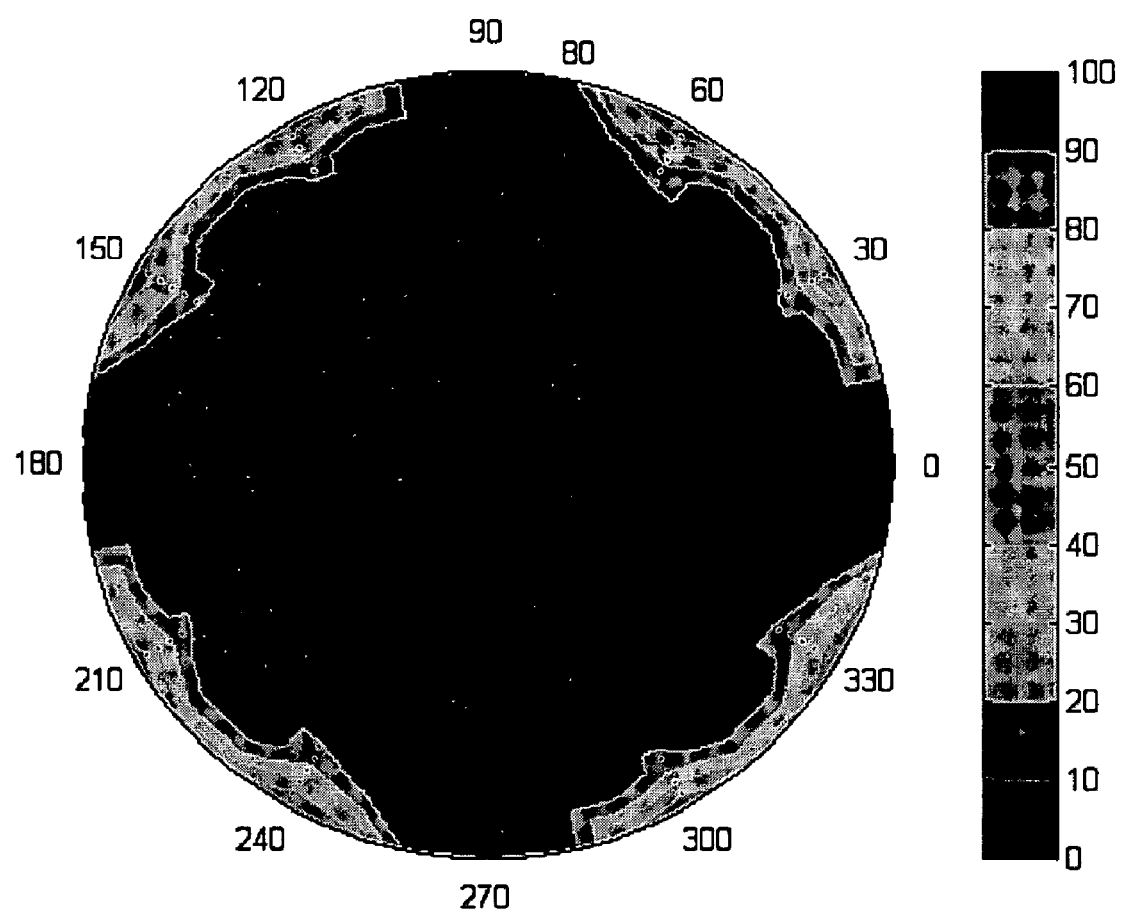
FIG. 6 is a simulation result of contrast ratio of the VA-LCD according to the first embodiment of the present invention over tilt viewing angles of from 0 to 80 degrees when using white-light.

When using white light, contrast characteristics over 0 to 80 degrees with respect to all azimuth angles is shown in FIG. 6. In FIG. 6, the center of the circle means that a tilt viewing angle is 0 degree, and as a radius becomes larger, the tilt viewing angles become larger. In FIG. 6, values 20, 40, 60 and 80 marked on the radius designate the tilt viewing angles.

Values 0 to 360 degrees marked along the circumference of the circle designate azimuth angles. The second polarizer is arranged in the direction of 0 degrees, and the first polarizer is arranged in the direction of 90 degrees, and contrast characteristics for all the viewing directions (0 to 80 degrees in the declination angle, 0 to 360 degrees in the azimuth angles) are shown. A VA-LCD using only a polarizer exhibits the contrast below 10:1 at the tilt viewing angle of 70 degrees, but referring to FIG. 6, the VA_LCD exhibits the excellent contrast ratio greater than 86:1 at the tilt viewing angle of 70 degrees.

Embodiment 2

Configuration of Second VA-LCD

Referring to FIG. 3, a VA-panel comprises a plurality of liquid crystal cells 8 filled with liquid crystals with a cell gap of 2.9 μm, a pre-title angle of 90 degrees, a dielectric anisotropy $\Delta\in$ is −4.9, and a birefringence $\Delta n$ is 0.099. The −C plate 7 is made of a liquid crystal film, has a thickness retardation value $R_{th}$ of −180 nm for a wavelength of 550 nm. The A1 plate 5 being close to the first polarizer 1 has an in-plane retardation value $R_{in}$ of 120 nm, and the A2 plate 9 being close to the second polarizer 3 has an in-plane retardation value $R_{in}$ of 80 nm. The inner protective films of the first polarizer 1 and the second polarizer 3 are made of TAC film with a thickness of 80 μm and a thickness retardation value of −56 nm.

When using white light, contrast characteristics over 0 to 80 degrees with respect to all azimuth angles are shown in FIG. 7. In FIG. 7, the contrast characteristic over 0 to 80 degrees with respect to all azimuth angles are excellent as the contrast ratio equal to or higher than 88:1 at the tilt viewing angle of 70 degrees.

Embodiment 3

Configuration of Third VA-LCD

Referring to FIG. 4, a VA-panel comprises a plurality of liquid crystal cells 8 filled with liquid crystals with a cell gap of 2.9 μm, a pre-title angle of 90 degrees, a dielectric anisotropy $\Delta\in$ is −4.9, and a birefringence $\Delta n$ is 0.099.

The bi-axial retardation film 11 being close to the first polarizer 1 has an in-plane retardation value $R_{in}$ of 70 nm and a thickness retardation value, $R_{th}$ of −140 nm. The +A plate 9 being close to the second polarizer 3 has an in-plane retardation value $R_{in}$ of 30 nm. The inner protective film of the first polarizer 1 is made of a TAC film with a thickness of 40 μm and its thickness retardation value is −28 nm. The inner protective film of the second polarizer 3 is made of TAC film and has a thickness of 80 μm and a thickness retardation value of −56 nm.

When using white light, contrast characteristics over 0 to 80 degrees with respect to all azimuth angles is shown in FIG. 8.

In FIG. 8, the contrast characteristics over 0 to 80 degrees with respect to all azimuth angles are excellent as the contrast ratio of 57:1 or higher at the tilt viewing angle of 70 degrees.

Embodiment 4

Configuration of Fourth VA-LCD

Referring to FIG. 5, a VA-panel comprises a plurality of liquid crystal cells 8 filled with liquid crystals with a cell gap of 2.9 μm, a pre-title angle of 90 degrees, a dielectric anisotropy $\Delta\in$ is −4.9, and a birefringence $\Delta n$ is 0.099.

The bi-axial retardation film 11 being close to the first polarizer 1 has an in-plane retardation value $R_{in}$ of 60 nm and a thickness retardation value $R_{th}$ of −190 nm. The +A plate 9 being close to the second polarizer 3 has an in-plane retardation value. $R_{in}$ of 30 nm. The inner protective film of the first polarizer 1 is made of cyclo-olefin (COP) with a thickness of 50 μm.

When using white light, contrast characteristics over 0 to 80 degrees with respect to all azimuth angles are shown in FIG. 9.

In FIG. 9, the contrast characteristics at the tilt viewing angle of 70 degrees are excellent as the contrast ratio of 51:1 or higher.

COMPARATIVE EXAMPLE 1

A VA-panel used in this experiment comprises a plurality of liquid crystal cells 8 filled with liquid crystals with a cell gap of 2.9 μm, a pre-tilt angle of 90 degrees, a dielectric anisotropy $\Delta\in$ is −4.9, and a birefringence $\Delta n$ is 0.099.

The bi-axial retardation film 11 being close to the first polarizer 1 has an in-plane retardation value $R_{in}$ of 32 nm and a thickness retardation value $R_{th}$ of −150 nm. The inner protective films of the first polarizer 1 and the second polarizer 3 are made of triacetate cellulose and have a thickness of 80 μm and a thickness retardation value of −56 nm.

Figure 10:
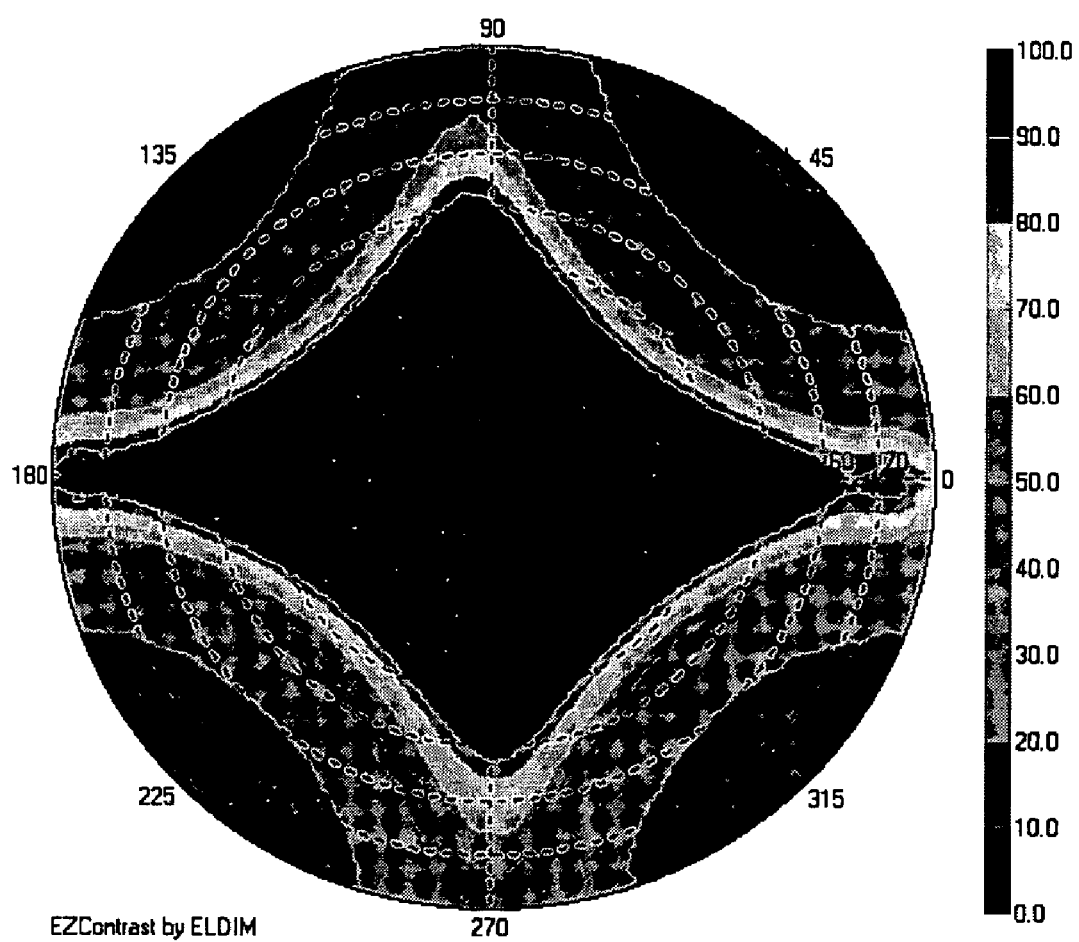
FIG. 10 is a simulation result of contrast ratio of the VA-LCD in which a double axis retardation film is provided between a liquid crystal cell and a first polarizer but a +A plate is not provided between the liquid crystal cell and a second polarizer, over 0 to 80 degrees of tilt viewing angles at every azimuth angles when using a white-light.

When using white light, contrast characteristics over 0 to 80 degrees with respect to all azimuth angles are shown in FIG. 10.

In FIG. 10, the contrast characteristics at the tilt viewing angle of 70 degrees are 10:1 at most, in the case that the +A plate is provided between the liquid crystal cell and the second polarizer.

COMPARATIVE EXAMPLE 2

A VA-panel used in this experiment comprises a plurality of liquid crystal cells 8 filled with liquid crystals with a cell gap of 2.9 μm, a pre-title angle of 90 degrees, a dielectric anisotropy $\Delta \in$ is −4.9, and a birefringence Δn is 0.099. The −C plate 7 is made of a liquid crystal film, and has a thickness retardation value $R_{th}$ of −120 nm for a wavelength of 550 mm. The A1 plate 5 being close to the first polarizer 1 has an in-plane retardation value $R_{in}$ of 50 nm, and the A2 plate 9 being close to the second polarizer 3 has an in-plane retardation value $R_{in}$ of 70 nm. The inner protective films of the first polarizer 1 and the second polarizer 3 are made of a TAC film with a thickness of 80 μm and a thickness retardation value of −56 nm. The −C plate 7 is made of a liquid crystal film.

Figure 12:
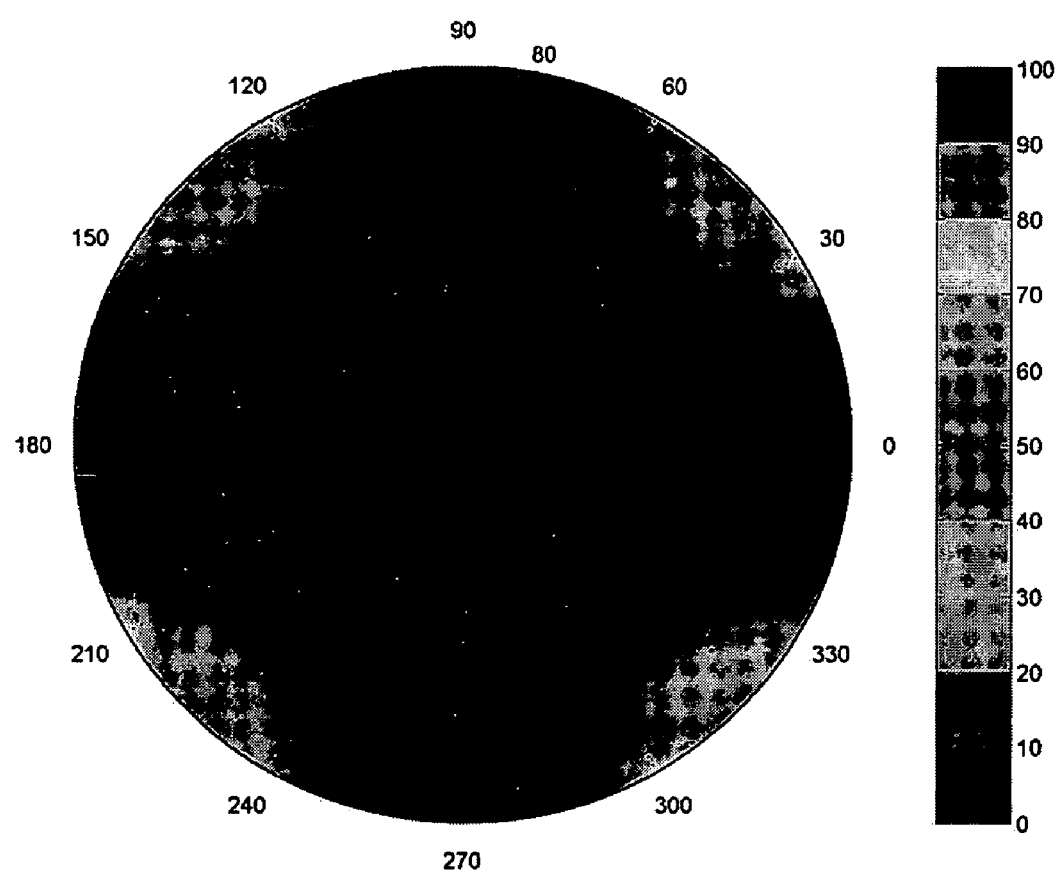
FIG. 12 is a simulation result of contrast ratio of the VA-LCD according to the second comparative example.

When using white light, contrast characteristics over 0 to 80 degrees with respect to all azimuth angles are shown in FIG. 12. In FIG. 12, the contrast characteristics at the tilt viewing angle of 70 degrees is 80:1 or more, thereby exhibiting the similar level of optical characteristics in FIG. 2 and FIG. 3.

Figure 11:
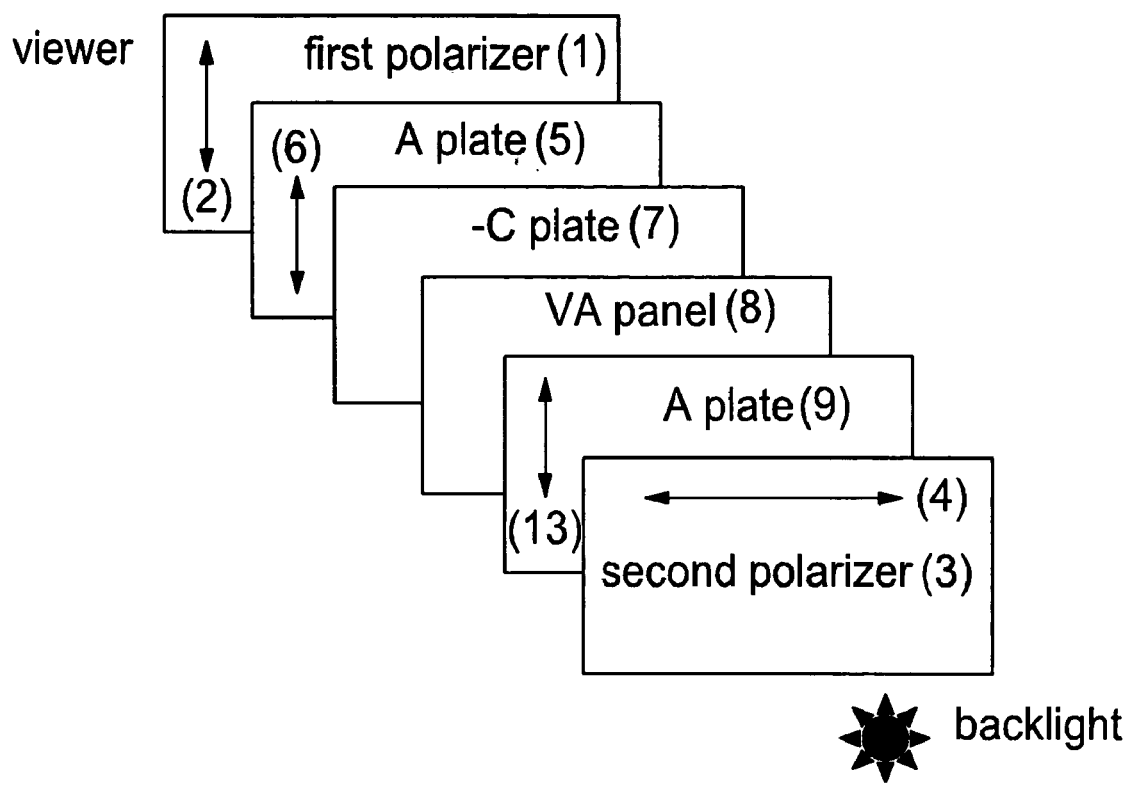
FIG. 11 is a schematic view illustrating a VA-LCD according to a second comparative example.

However, the configuration of FIG. 11 is a low effective configuration. In FIGS. 2 and 3, the optical axis of the A2 plate and the absorption axis of the second polarizer are parallel with each other. Since the optical axis of the A plate is a machine direction (MD), a roll to roll process is possible. On the other hand, in the configuration of FIG. 11, since the optical axis of the A2 plate is perpendicular to the absorption axis of the second polarizer being close to the A2 plate, there is inconvenience in process work to combine plates by cutting a single plate and turning the plates.

Accordingly, the configuration of FIG. 11 has not an advantage more than the configurations of FIGS. 2 and 3 in aspects of manufacturing process and cost.

The VA-LCD according to the present invention has an advantage that viewing angle compensation effect is enhanced due to the arrangement of the viewing angle compensation films, thereby implementing the wider viewing angle characteristic. The VA-LCD according to the present invention exhibits a high contrast ratio at the right and tilt angles.

While the invention has been shown and described with reference to certain embodiments thereof, it will be understood by those skilled in the art that various changes in form and details may be made therein without departing from the spirit and scope of the invention as defined by the appended claims.

What is claimed is:

1. A vertically aligned liquid crystal display (VA-LCD) having liquid crystal cells in which liquid crystals with a negative dielectric anisotropy are filled and which is provided between a first polarizer and a second polarizer, whose absorption axises are perpendicular to each other, comprising:
    a sheet of +A plate and a sheet of −C plate, disposed between the first polarizer and the liquid crystal cells; and
    a sheet of +A plate disposed between the second polarizer and the liquid crystal cells,
    wherein an optical axis of the +A plate near the first polarizer is perpendicular to the absorption axis of the first polarizer, and an optical axis of the +A plate near the second polarizer is parallel with the absorption axis of the second polarizer, and
    wherein a thickness retardation value of the −C plate is in the range of −500 nm to −30 nm for a wavelength of 550 nm.

2. The VA-LCD according to claim 1, wherein an in-plane retardation value of the +A plate near the first polarizer is in the range of 50 nm to 300 nm for a wavelength of 550 nm.

3. The VA-LCD according to claim 1, wherein an in-plane retardation value of the +A plate near the second polarizer is in the range of 30 to 600 nm for a wavelength of 550 nm.

4. The VA-LCD according to claim 1, wherein the first polarizer and the second polarizer respectively have an inner protective film, and the inner protective films of the first polarizer and the second polarizer have zero or a negative value of thickness retardation.

5. The VA-LCD according to claim 1, the +A plate comprises a polymer film or a UV setting liquid crystal film.

6. The VA-LCD according to claim 1, wherein the −C plate comprises a polymer film or a UV setting liquid crystal film.

7. The VA-LCD according to claim 1, wherein the first polarizer and the second polarizer respectively have an inner protective film, and the inner protective films of the first polarizer and the second polarizer comprise undrawn cyclo-olefin, undrawn triacetate cellulose, or undrawn polynorbonene.

8. The VA-LCD according to claim 1, wherein the VA-LCD uses a multidomain vertically aligned (MVA) mode or a vertically aligned (VA) mode which utilizes a chiral additive, and a cell gap of the liquid crystal cells is 2.5 to 8 μm.

9. A VA-LCD having liquid crystal cells in which liquid crystals with a negative dielectric anisotropy are filled and which are disposed between a first polarizer and a second polarizer, whose absorption axises are perpendicular to each other, comprising:
    a bi-axial retardation film disposed between the first polarizer and the liquid crystal cells; and
    a sheet of +A plate disposed between the second polarizer and the liquid crystal cells,
    wherein an optical axis of the bi-axial retardation film near the first polarizer is perpendicular to the absorption axis of the first polarizer, and an optical axis of the +A plate is parallel with the absorption axis of the second polarizer, and
    wherein the bi-axial retardation film has an in-plane retardation value in the range of 30 to 200 nm and a thickness retardation value in the range of −300 nm to −50 nm for a wavelength of 550 nm.

10. The VA-LCD according to claim 9, wherein an in-plane retardation value of the +A plate near the second polarizer is in the range of 30 to 600 nm for a wavelength of 550 nm.

11. The VA-LCD according to claim 9, wherein the +A plate functions as an inner protective film of the polarizer.

12. The VA-LCD according to claim 9, wherein the bi-axial retardation film functions as an inner protective film of the polarizer.

13. The VA-LCD according to claim 9, wherein the bi-axial retardation film is one of cyclo-olefin, drawn triacetate cellulose, drawn polynorbonene and bi-axial liquid crystal film.

14. The VA-LCD according to claim 9 wherein the first polarizer and the second polarizer respectively have an inner protective film, and the inner protective films of the first polarizer and the second polarizer have zero or a negative value of thickness retardation.

15. The VA-LCD according to claim 9, the +A plate comprises a polymer film or a UV setting liquid crystal film.

16. The VA-LCD according to claim 9, wherein the −C plate comprises a polymer film or a UV setting liquid crystal film.

17. The VA-LCD according to claim 9, wherein the first polarizer and the second polarizer respectively have an inner protective film, and the inner protective films of the first polarizer and the second polarizer comprise undrawn cyclo-olefin, undrawn triacetate cellulose, or undrawn polynorbonene.

18. The VA-LCD according to claim 9, wherein the VA-LCD uses a multidomain vertically aligned (MVA) mode or a vertically aligned (VA) mode which utilizes a chiral additive, and a cell gap of the liquid crystal cells is 2.5 to 8 µm.

* * * * *